June 14, 1927.
G. J. THOMAS
UNIVERSAL JOINT
Filed June 18, 1924    2 Sheets-Sheet 1
1,632,202
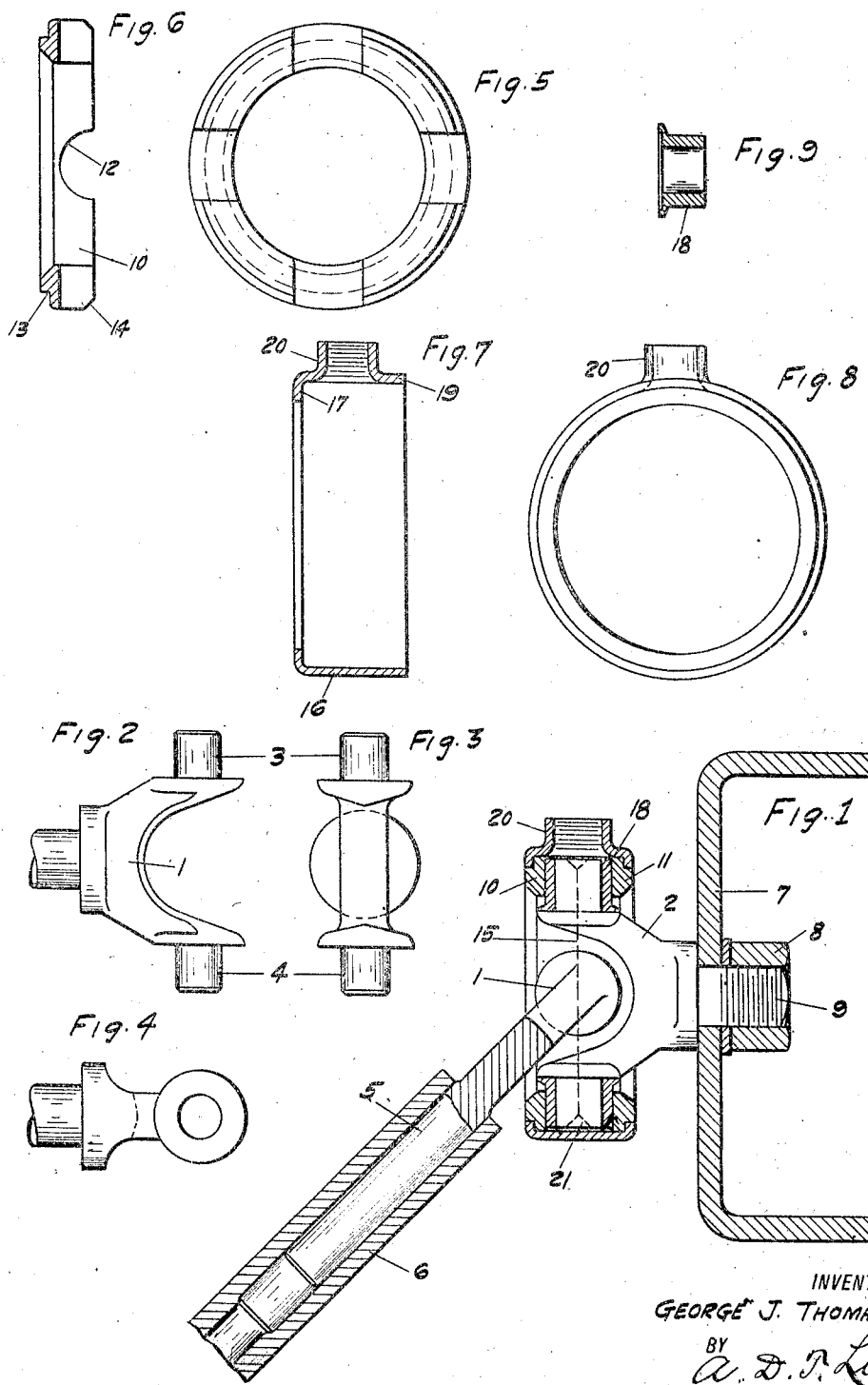
INVENTOR
GEORGE J. THOMAS
BY
A. D. T. Libby
ATTORNEY

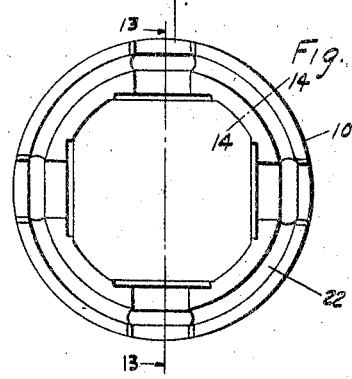
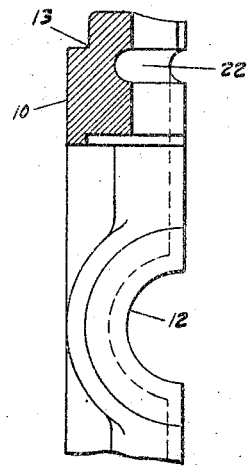
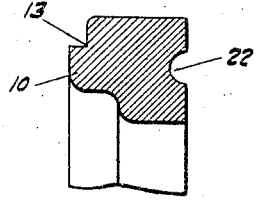
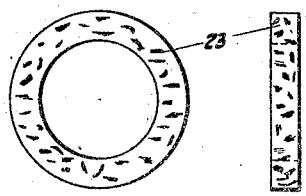
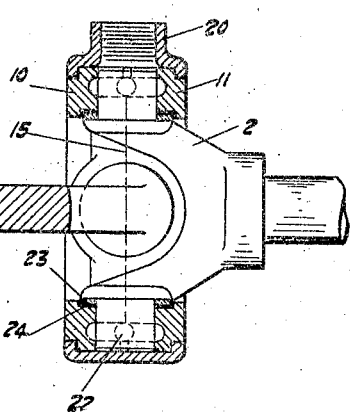

Patented June 14, 1927.

1,632,202

UNITED STATES PATENT OFFICE.

GEORGE JOSEPH THOMAS, OF SOUTH BEND, INDIANA, ASSIGNOR, BY MESNE ASSIGNMENTS, TO BENDIX BRAKE COMPANY, A CORPORATION OF ILLINOIS.

UNIVERSAL JOINT.

Application filed June 18, 1924. Serial No. 720,835.

This invention relates to the construction of a joint of the universal type commonly used in various places where it is necessary to transmit rotary movement between two members operated at an angle to each other.

In order to illustrate one application of my invention, I have shown in addition to the details of the joint, one of the joints applied to the chassis end of the control shaft on front wheel brakes in which one of the joint members is preferably rigidly fastened to the side of the chassis, while the other joint member has an oscillatory motion. It will be understood that at the wheel end both joint members have rotary motion at any operating angle of the wheel. It is therefore seen that the drawings are merely illustrative of my invention and in no sense depict the various applications of which the invention is capable.

It is the principal object of my invention to provide a universal joint which is relatively simple and hence easy and cheap to manufacture.

Other objects will be apparent from a reading of the specification taken in connection with the annexed drawing, wherein:

Figure 1 illustrates a part sectional view through the joint as applied to the chassis end of front wheel brake controls.

Figure 2 is an elevation of one of the joint members, both of which are substantially alike.

Figure 3 is an end view of Fig. 2; and

Figure 4 is a plan view of Fig. 2.

Figure 5 is a face view of the ring member used for holding the joint members together;

Figure 6 being a vertical sectional view of Fig. 5.

Figure 7 is a sectional view of the clamping member used for holding the parts of the joint in operative position.

Figure 8 is a plan view of Fig. 7; while

Figure 9 is a sectional view of a bearing bushing, preferably used in the construction of the joint.

Figure 10 illustrates a part sectional view through a slightly modified form of joint.

Figure 11 is a face view of one of the ring members shown in Fig. 10.

Figure 12 is a top view of Fig. 11.

Figure 13 is a sectional view on line 13—13 of Fig. 11, the section being enlarged to about double size.

Figure 14 is an enlarged sectional view on line 14—14 of Fig. 11.

Figure 15 is an enlarged view of a packing washer used in the assembly of the joint.

Figure 16 is a side elevation of Fig. 15.

Figure 17 is a sectional view of a protecting and bearing cup washer used in the assembly of the joint.

Referring now to the details wherein like members refer to corresponding parts in the various views 1 and 2 are joint members substantially alike at the joint itself and each provided with bearing pivot pins or trunnions 3 and 4. As shown in Fig. 1, the joint member 1 has a shaft extension 5 slidably carried in a control shaft 6, which extends to a joint member used at the wheel end of the vehicle. The member 2 is fastened to the side member 7 of the chassis in any suitable manner as by a nut 8 engaging the threaded portion 9 of the extension of the member 2. The joint members 1 and 2 are held in operative position by a pair of rings 10 and 11, which I preferably make substantially alike by either taking an annular disc and cross-boring it and then sawing the disc in two, or clamping in a suitable fixture two discs and cross-boring to form the diametrically oppositely positioned recesses 12, or these recesses may be formed in the pieces 10 and 11 in any other satisfactory manner, for example, the parts 10 and 11 may be die castings, the main thing being that these recesses are of suitable character to receive the bearing pins 3 and 4, which are arranged 180 degrees apart on their respective members 1 and 2.

The members 10 and 11 are provided with an annular shoulder 13, and the face in which the recesses 12 are formed may be provided with a chamfered edge 14, so that when the two faces are brought together, as indicated by the dotted line 15, Fig. 1, a space at their junction is obtained in which lubricant may be placed during the assembly of the joint. However, what I consider to be a better means for lubricating the joint is indicated in Fig. 11 wherein the parts 10 and 11 are provided with an annular groove 22 extending not only arcuately across each recess 12 but connecting the recesses together as will be seen in Fig. 10. The grooves 22 register so as to form a considerable space for lubricant. This construction is particularly advantageous for the reason that the lubricant stored in the space formed by the grooves 22 can pass in any direction to the various trunnions or bearing pins and their seats or recesses 12. Furthermore, the lubricant being stored in the annular space 22 formed by the junction of the members 10 and 11 cannot be thrown out by centrifugal force without passing through the seats containing the trunnions or bearing pins, 3 and 4 whereas if the space formed by the chamfered edges 14 is relied on entirely to contain the lubricant, centrifugal force has a tendency to keep the lubricant from working into the bearings during the rotation of the joint members.

The members 10 and 11 are held together by a clamping band 16. As shown in Fig. 7, the band is formed with a collar 17, which engages the shoulder 13 on one of the members, for example 10, when placed in position within the band. In the assembly Fig. 1, I have shown bearing bushings 18 over each of the pins 3 and 4, and these bushings rest in the recesses 12, but in Fig. 10 no bushings are shown. In the form shown in Fig. 10 there is used a washer 23 made of suitable packing material such as cork over which is placed a cup metal washer 24, preferably of steel. The thickness of the washer 23 is such that during the assembly it will be compressed about one half of its normal thickness so that in operation it will exclude dirt and water from the joint bearings, at the same time it will retain the lubricant. While this construction provides lubrication and protection to the joint parts, it further serves to take up all wear and prevents rattle between the joint members.

After the joint members 1 and 2 have been placed in position, the other member 11, which is preferably a duplicate of 10, is placed in position and the edge 19 of the clamping band is spun over the shoulder 13 as is clearly indicated in Fig. 1, thereby completing the assembly of the joint. The clamping band 16 is provided with a projection 20 which may have pipe threads therein in order that a lubricating cup may be attached thereto, in order to pass lubricant to the peripheral space 21 or to the annular grooves 22 or to both when used.

The manner of adding lubricant to the space 21 or grooves 22 may take any other desired form than that above described, likewise certain of the other details of my invention may be varied without departing from the spirit of the same or the scope of the appended claims.

Having thus described my invention, what I claim is:

1. A device for enclosing and lubricating the bearing pins of a universal joint, comprising a pair of substantially similar rings having similarly formed and arranged recesses for the pins in their corresponding faces, each of said rings having a continuous, circular groove for lubricant in their corresponding faces with means for passing lubricant to said grooves, said grooves communicating directly with said recesses, and means for preventing the escape of lubricant from the recesses comprising a band encircling the outer periphery of said rings for clamping them securely together.

2. In a device of the class described, a pair of rings, each having an equal number of recesses diametrically and similarly arranged in their corresponding faces, a pair of joint members, each having bearing pins diametrically arranged to lie in said ring recesses, each of said rings being provided with an annular shoulder, a clamping band fitting over the abutting edges of said rings at said shoulders for holding the joint members in operative position, and means for lubricating said bearing pins including an annular lubricant space continuous with said pin recesses and formed by the junction of said ring faces.

3. A device for enclosing and lubricating the bearing pins of a universal joint comprising a pair of substantially similar rings having similarly formed and arranged recesses for the pins in their corresponding faces, each of said rings having an annularly formed part connecting said recesses and cooperating with a corresponding part on their respective faces when joined together in abutting relation to form a space for lubricant with means for passing lubricant to said space, a band encircling the outer periphery of said rings for clamping them securely together and covering the abutting faces thereof whereby the escape of lubricant from the recesses is prevented, and a pair of joint members, each having oppositely disposed bearing pins seated in corresponding recesses as described.

4. In a device for enclosing and lubricating the bearing trunnions of a universal joint, a pair of rings for engaging the trunnions, at least one of said rings being provided in its face with an annular lubricating groove, said groove extending between said trunnion bearings, and a band encircling the rings and having integral edges turned over the sides of the rings for clamping said rings in operative position with respect to the trunnions and retaining the lubricant between the rings.

5. In a device of the class described, a pair of joint members each having bearing trunnions, means for enclosing and lubricating the trunnions comprising a pair of rings for engaging the trunnions, a band encircling the rings and having its edges turned over the edges of the rings for clamping the abutting faces of said rings in operative position with respect to the trunnions, and means for lubricating said trunnions including a groove for lubricant in the face of at least one of said rings, so that centrifugal force will tend to force the lubricant in the groove into the trunnion bearings as described.

6. In a device of the class described, a pair of joint members each having bearing trunnions, a pair of rings for engaging the trunnions, means for lubricating said trunnions including a groove for lubricant in the face of at least one of said rings, so that centrifugal force will tend to force the lubricant in the groove into the trunnion bearings, a band encircling the rings having its edges turned over the sides of the rings for covering the joint between the rings and clamping them in operative position with relation to the trunnions.

7. In a device of the class described, a pair of joint members each having bearing trunnions, members for engaging said trunnions, and a band encircling said members and having its edges turned over the sides of said members for clamping said members in operative position with respect to the trunnions and having a drawn out seat for a lubricant fitting opposite one of the trunnions.

8. In a device of the class described, a pair of joint members each having bearing trunnions, members for engaging said trunnions, and a band encircling said members and having its edges turned over the sides of said members for clamping said members in operative position with respect to the trunnions, and means for lubricating said trunnions including a groove formed by said members.

In testimony whereof, I affix my signature.

GEORGE JOSEPH THOMAS.